United States Patent
Carrel-Billiard

[15] 3,666,229
[45] May 30, 1972

[54] VALVE APPARATUS FOR SHUTTERING REMOVAL

[72] Inventor: Pierre A. M. Carrel-Billiard, Savigny-Sur-Orge, France

[73] Assignee: Materiel Special D'Enterprises, Juvisy-sur-Orge, France

[22] Filed: May 18, 1970

[21] Appl. No.: 38,216

[52] U.S. Cl. ................................. 249/66, 25/120, 249/189
[51] Int. Cl. ............................................................. B28b 7/12
[58] Field of Search ................. 249/66, 28, 29, 189; 25/120; 137/360, 541

[56] References Cited

UNITED STATES PATENTS

| | | |
|---|---|---|
| 1,862,368 | 6/1932 | Cuthbertson .................. 137/541 X |
| 620,936 | 3/1899 | Kunzer ........................... 137/541 |
| 2,850,785 | 9/1958 | Rushing ......................... 249/66 X |
| 3,151,374 | 10/1964 | Kersten .......................... 249/66 X |
| 2,480,477 | 8/1949 | Joney ............................. 249/66 X |
| 3,316,607 | 5/1967 | Kroll .............................. 249/66 X |
| 1,198,287 | 9/1916 | Spencer .......................... 137/541 X |
| 1,516,531 | 11/1924 | Halteman ....................... 137/541 X |
| 574,992 | 1/1897 | Held ............................... 137/541 X |

*Primary Examiner*—J. Spencer Overholser
*Assistant Examiner*—Ben D. Tobor
*Attorney*—Ernest A. Greenside

[57] ABSTRACT

A valve apparatus for use in the removal of shuttering by means of compressed air or other gas. The apparatus comprises a valve body insertible into an aperture in a shuttering plate and having a flange formed at one end thereof for abutment with the inside surface of the shuttering plate. The valve body has a hollow cylindrical portion which extends from the flange and is externally screw-threaded to engage a nut which can be screwed towards the flange so as to clamp the shuttering plate between the nut and the flange, thereby securing the valve apparatus in position. The cylindrical body portion is also connectible with a pipe for supplying compressed air or other gas and accommodates a valve closure device which normally closes an opening through the flange end of the valve body. The valve closure device preferably has a frusto-conical closure element which seats in said opening, the opening also having a frusto-conical configuration but the angle of taper of the closure element being greater than that of the opening, the maximum diameters of the closure element and opening being substantially equal.

6 Claims, 1 Drawing Figure

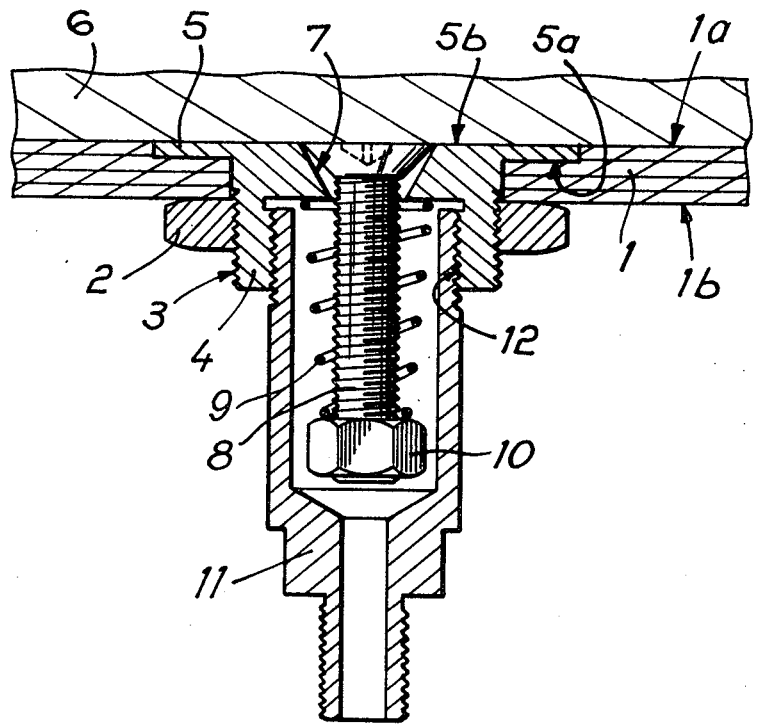

VALVE APPARATUS FOR SHUTTERING REMOVAL

This invention is concerned with improvements in or relating to shuttering removal.

The removal of shuttering by compressed air, and more generally by a compressed gas, is now currently used in the building industry. This is how, in particular, ribbed ceilings are made with moulding honeycombs.

For this purpose, there has been developed the use of certain valves, which facilitate the removal of shuttering. The most simple construction of these valves is realized by a wide-mouthed hole, which emerges near the surface of the mould and is provided in the shuttering itself, and by a connection to a pipe supplying gas under pressure.

This method, however, has certain disadvantages. Firstly, as is obvious, if the wide-mouthed hole is provided in the shuttering itself, it is an integral part of it. When the valve is more elaborate and comprises spring valves, for example, it is then integral with a single shuttering and cannot be re-used on another shuttering which can be a disadvantage. In addition, this type of valve must be carefully fixed to the shuttering which is not actually possible with shuttering of plastics material, since fixing is difficult.

In order to remedy these disadvantages, the applicant proposes a new type of valve, the main advantage of which lies in its ease of removal.

Accordingly, it is an object of the invention to provide a device for removing shuttering in which the shuttering is removed by a compressed gas and constituted by a shuttering plate of slight thickness in which there emerges a wide-mouthed hole attached by a connection to a pipe supplying the compressed gas.

The wide-mouthed hole is provided in a part, separate from the shuttering plate and constituted by a body provided on its outer side with a thread and by a cover, which extends perpendicularly to the axis of the thread, and the face of which, located on the side of the said thread, is plane.

Since the shuttering plate is provided with an aperture allowing a passage for the body of the part, this latter is supported on the upper side of the plate by its own flat side located on the side of the thread, it is fixed to the plate by means of a nut, which in order to do this co-operates with the thread. Finally, the connection to the compressed gas pipe is provided in the body of the part.

The invention will now be described by way of example with reference to the accompanying drawing, in which the single FIGURE is an axial section of one embodiment of a device according to the invention.

Referring to the drawing, a part, separate from a shuttering plate 1, is connected to this plate 1 and is fixed thereto by means of a nut 2 screwed onto a thread 3 provided on the outer side of the body 4 of the part. When the nut 2 abuts against the inner side 1b of the plate 1, the part abuts against the upper side 1a of the said plate by means of a cover 5, the inner side 5a, which is directed towards the thread 3, being in contact with the upper side 1a. At 6, above the upper side 1a there is partially shown a slab of cast concrete.

In addition, it will be noted that the plate 1 is provided with an aperture which provides a passage for the body 4 in order that the nut 2 urges the cover 5 effectively to the plate 1. A countersunk hole 7 opens onto the upper side 5b of the cover 5 and can advantageously be blocked by the head of a screw 8 which tapers at an angle greater than that of the hole 7 in order that the contact between said hole and the screw head takes place preferably at the level of the upper side 5b of the cover 5. In fact, this screw 8 constitutes a valve for the hole 7, a spring 9 abutting against the inner side of the cover 5 and against a nut 10 provided on the thread of the screw 8.

Finally, it will be noted that, in known manner a compressed air pipe 11 surrounds the screw 8 and is screwed on to a thread 12 of the body 4.

Variations in the above embodiment may be made without diverging from the scope of the present invention. It will be understood that the very simple method of fixing the body 4 on the plate 1 by means of the nut 2 facilitates mounting and dismounting of the valve without particular difficulty and thus allows a very flexible use of this type of valve.

But it will also be noted that in the case of the plate 1 being made of sheet steel, it is also possible to weld the valve onto this sheet, this possibility of attachment being excluded if the plate 1 is fabricated in plastics material. In this latter combination, which is desirable in certain cases, as combining the advantages of an easy removal from the mould due to the low coefficient of adhesion of the plastic and the effectiveness of the valve for removing the mould, only the method of mounting according to the invention is viable. In fact, it is no longer possible to fix the valve on the plate 1 by welding.

The invention thus obviously makes technical progress, since it leads to the production of shuttering made from plastics material provided with the most efficient valves. However, it is understood that it applies only preferably, but not exclusively to shuttering made of plastics material.

What is claimed is:

1. Valve apparatus comprising a shuttering plate formed with a recessed opening, a separate body having an apertured flange portion supported in said recessed opening with its upper surface substantially co-planar with the upper surface of the shuttering plate, said body having a hollow cylindrical body portion extending from said flange portion and projecting through and past said plate opening, with the opening defined by the cylindrical body portion in communication with said aperture in said flange portion, means for securing said body against movement relative to the shuttering plate, and a valve device mounted on the body and biased to normally close the aperture in the flange portion of the body.

2. Valve apparatus according to claim 1, wherein the external surface of that part of the hollow cylindrical body extending past said recessed opening in said plate is screw-threaded, said securing means comprising a nut engaging said screw-threaded surface and being movable towards said flange portion for clamping the shuttering plate between said nut and said flange portion.

3. Valve apparatus according to claim 1, wherein the inner surface of said hollow cylindrical body portion is threaded, and conduit means threadedly connected at one end of the inner threads of the hollow body portion, the opposite end of said conduit means being adapted to be connected to a source of pressure.

4. Valve apparatus according to claim 3, wherein said valve device comprises a screw terminating in a head normally sealingly engaging the aperture in said flange portion of said body, said screw having a shank portion disposed within said conduit means.

5. Valve apparatus according to claim 1, wherein the valve device has a frusto-conical closure element and said aperture in said flange portion provides a frusto-conical seat for said element.

6. Valve apparatus according to claim 5, wherein the angle of taper of the closure element is greater than that of the aperture and the maximum diameters of the closure element and aperture are substantially equal.

* * * * *